US012640845B2

(12) United States Patent
Yang et al.

(10) Patent No.: US 12,640,845 B2
(45) Date of Patent: May 26, 2026

(54) LOW-DENSITY PARITY-CHECK CODING INCLUDING PUNCTURED AUXILIARY BITS

(71) Applicant: QUALCOMM Incorporated, San Diego, CA (US)

(72) Inventors: Wei Yang, San Diego, CA (US); Pinar Sen, San Diego, CA (US); Thomas Joseph Richardson, South Orange, NJ (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 400 days.

(21) Appl. No.: 18/329,569

(22) Filed: Jun. 5, 2023

(65) Prior Publication Data

US 2024/0405918 A1 Dec. 5, 2024

(51) Int. Cl.
*H04L 1/00* (2006.01)
*H04W 28/04* (2009.01)

(52) U.S. Cl.
CPC .......... *H04L 1/0063* (2013.01); *H04W 28/04* (2013.01)

(58) Field of Classification Search
CPC ... H04L 1/0063; H04L 1/0056; H04L 1/0061; H04W 28/04; H03M 13/31; H03M 13/1188; H03M 13/611; H03M 13/616; H03M 13/6362; H03M 13/116
See application file for complete search history.

(56) References Cited

U.S. PATENT DOCUMENTS

| | | | |
|---|---|---|---|
| 7,747,934 B2 | 6/2010 | Livshitz | |
| 2017/0331497 A1 | 11/2017 | Richardson et al. | |
| 2019/0036547 A1 | 1/2019 | Kim et al. | |
| 2019/0052400 A1* | 2/2019 | Soriaga | H03M 13/6393 |
| 2020/0145139 A1* | 5/2020 | Merlin | H04L 1/1812 |
| 2021/0211143 A1* | 7/2021 | Richardson | H03M 13/036 |
| 2022/0352904 A1* | 11/2022 | Montorsi | H03M 13/116 |
| 2025/0132862 A1* | 4/2025 | Lin | H03M 13/116 |
| 2025/0192919 A1* | 6/2025 | Wang | H04L 1/005 |

FOREIGN PATENT DOCUMENTS

WO 2014127129 A1 8/2014

OTHER PUBLICATIONS

Cohen A.E., et al., "A Low-Complexity Hybrid LDPC Code Encoder for IEEE 802.3an (10GBase-T) Ethernet", IEEE Transactions on Signal Processing, IEEE Service Center, New York, NY, US, vol. 57, No. 10, Oct. 1, 2009, pp. 4085-4094, XP011268804, the whole document.
International Search Report and Written Opinion—PCT/US2024/028646—ISA/EPO—Aug. 6, 2024.

(Continued)

*Primary Examiner* — Ricky Q Ngo
*Assistant Examiner* — Kabir U Jahangir
(74) *Attorney, Agent, or Firm* — Harrity & Harrity, LLP

(57) ABSTRACT

A low-density parity-check encoder is provided that encodes a plurality of information bits according to a low-density parity-check matrix. The encoder generates auxiliary bits from the information bits, and the transmitter punctures the auxiliary bits while transmitting the information bits, thereby preserving a shape of the information bits.

30 Claims, 7 Drawing Sheets

800

Selecting a matrix $Q_{ZxZ}$ that is equal to a sum of a set of ZxZ lifting matrices in a first column of a low-density parity-check matrix, further wherein the matrix $Q_{ZxZ}$ is invertible — 801

Lifting a base graph according to a value of Z and the matrix $Q_{ZxZ}$ to create low-density parity-check matrix — 802

Encoding a plurality of $K_b*Z$ information bits into a codeword of $(K_b + Y)*Z$ bits according to the low-density parity-check matrix, wherein $K_b$ is a quantity of information bit columns in the base graph associated with the low-density parity-check matrix — 803

Transmitting one or more symbols conveying information based upon the codeword — 804

(56) References Cited

OTHER PUBLICATIONS

Steiner F., et al., "Design of Robust, Protograph Based LDPC Codes for Rate-adaptation Via Probabilistic Shaping", Proc., 9th International Symposium on Turbo Codes and Iterative Information Processing (ISTC), IEEE, Sep. 5, 2016, pp. 56-60, XP032981264, the whole document.

Richardson T., et al., "Design of Low-Density Parity Check Codes for 5G New Radio", IEEE Communications Magazine, Key Technologies for 5G New Radio, vol. 56, No. 3, Mar. 1, 2018, XP055480192, pp. 28-34.

* cited by examiner

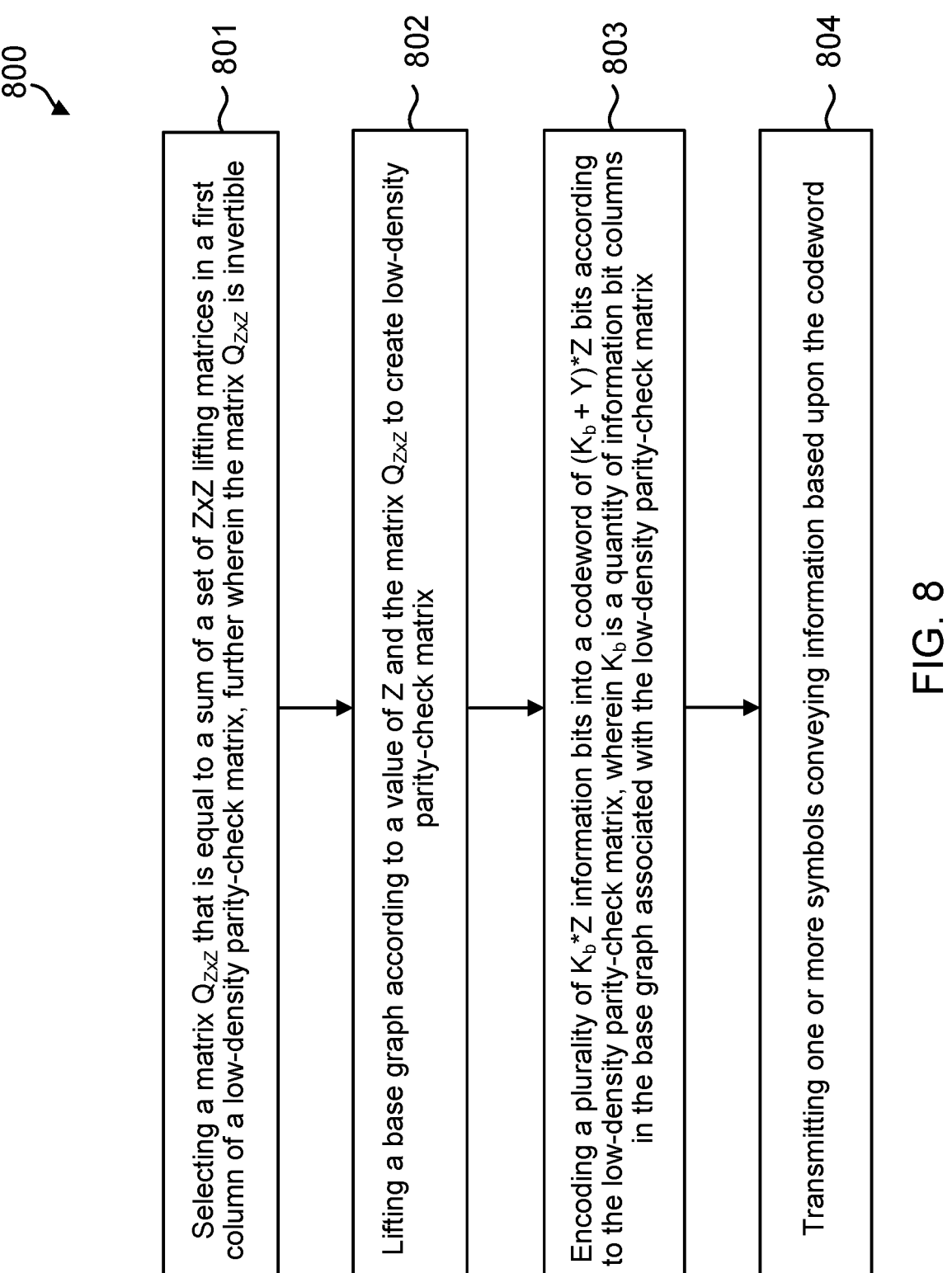

800

801
Selecting a matrix $Q_{ZxZ}$ that is equal to a sum of a set of ZxZ lifting matrices in a first column of a low-density parity-check matrix, further wherein the matrix $Q_{ZxZ}$ is invertible 802
Lifting a base graph according to a value of Z and the matrix $Q_{ZxZ}$ to create low-density parity-check matrix 803
Encoding a plurality of $K_b*Z$ information bits into a codeword of $(K_b + Y)*Z$ bits according to the low-density parity-check matrix, wherein $K_b$ is a quantity of information bit columns in the base graph associated with the low-density parity-check matrix 804
Transmitting one or more symbols conveying information based upon the codeword

FIG. 8

LOW-DENSITY PARITY-CHECK CODING INCLUDING PUNCTURED AUXILIARY BITS

TECHNICAL FIELD

This application relates to wireless communication systems, and more particularly to a wireless communication system with low-density parity-check coding including punctured auxiliary bits.

INTRODUCTION

Although modern communication standards such as the New Radio (NR) 5th generation (5G) standard are utilizing additional frequency bands as compared to older standards, the communication is still bandwidth limited. The resulting bandwidth limitation over which transmissions must occur restricts the theoretically achievable data rates. To approach this theoretical minimum through increased spectral efficiency, 5G systems may use higher-order modulation schemes in which bits are encoded to form a symbol. For example, in an M-ary quadrature amplitude modulation (QAM), M bits are encoded to form a symbol selected from a constellation of $2^M$ possible QAM symbols, where M is a positive integer.

Should each symbol in the constellation have the same probability of being transmitted, a "shaping gap" occurs that reduces the spectral efficiency by up to 1.53 dB. To reduce or eliminate this shaping gap, some higher-order modulation schemes may utilize probabilistic amplitude shaping (PAS). In PAS, an outer layer of amplitude shaping maps input bits into amplitudes that have a non-uniform distribution (ideally, a Gaussian distribution). These amplitudes are then binary encoded to form a corresponding stream of information bits that are processed according to an inner layer of binary forward-error-correction (FEC) encoding to provide parity bits for a phasing of the amplitudes to create the symbol constellation. It is advantageous to implement the FEC encoding using a low-density parity-check code (LDPC).

In 5G, there are two base graph matrices for LDPC: base graph 1 (BG1) and base graph 2 (BG2). For each base graph matrix, the information bits corresponding to the first two columns of the matrix are punctured and thus not transmitted. Although this puncturing is advantageous with respect to improving coding performance, the puncturing may degrade the reduction of the shaping gap by the probabilistic amplitude shaping.

SUMMARY

The following summarizes some aspects of the present disclosure to provide a basic understanding of the discussed technology. Its sole purpose is to present some concepts of one or more aspects of the disclosure in summary form as a prelude to the more detailed description that is presented later.

In one aspect of the disclosure, a wireless device includes: an encoder configured to encode a plurality of $K_b*Z$ information bits into a codeword of $(K_b+Y)*Z$ bits according to a low-density parity-check matrix, wherein $K_b$ is a quantity of information-bit columns in a base graph associated with the low-density parity-check matrix, wherein a first Z bits of the codeword are auxiliary bits and a subsequent $(K_b+Y-1)*Z$ bits of the codeword include the $K_b*Z$ information bits and $(Y-1)*Z$ additional parity bits, wherein Z is a lifting factor of the low-density parity-check matrix, and wherein Y is a positive integer.

In yet another aspect of the disclosure, a wireless device includes: an encoder configured to encode a plurality of $K_b*Z$ information bits into a codeword of $(K_b+Y)*Z$ bits according to a low-density parity-check matrix, wherein $K_b$ is a quantity of information-bit columns in a base graph associated with the low-density parity-check matrix, wherein a first $K_b*Z$ bits of the codeword are information bits and a subsequent $(Y-1)*Z$ bits of the codeword are parity bits, further wherein remaining Z bits of the codeword are auxiliary bits, wherein Z is a lifting factor of the low-density parity-check matrix, and wherein Y is a positive integer.

In yet another aspect of the disclosure, a computerized method includes: selecting a matrix $Q_{Z\times Z}$ that is equal to a sum of a set of Z×Z lifting matrices in a first column of a low-density parity-check matrix, further wherein the matrix $Q_{Z\times Z}$ is invertible; lifting a base graph according to a value of Z and the matrix $Q_{Z\times Z}$ to create the low-density parity-check matrix; encoding a plurality of $K_b*Z$ information bits into a codeword of $(K_b+Y)*Z$ bits according to the low-density parity-check matrix, wherein $K_b$ is a quantity of information-bit columns in the base graph, wherein a set of Z bits of the codeword are auxiliary bits and a set of $(K_b+Y-1)*Z$ bits of the codeword include the $K_b*Z$ information bits and $(Y-1)*Z$ parity bits, wherein Y is a positive integer; and transmitting one or more symbols conveying information based upon the codeword.

In yet another aspect of the disclosure, a computerized method includes: selecting a matrix $Q_{Z\times Z}$ that is equal to a sum of a set of Z×Z lifting matrices in a first column of a low-density parity-check matrix, further wherein the matrix $Q_{Z\times Z}$ is invertible; lifting a base graph according to a value of Z and the matrix $Q_{Z\times Z}$ to create the low-density parity-check matrix; encoding a plurality of $K_b*Z$ information bits into a codeword of $(K_b+Y)*Z$ bits according to a low-density parity-check matrix, wherein $K_b$ is a quantity of information-bit columns in the base graph, wherein a first $K_b*Z$ bits of the codeword are information bits and a subsequent $(Y-1)*Z$ bits of the codeword are parity bits, further wherein Z bits between the information bits and the parity bits are auxiliary bits, and wherein Y is a positive integer; and transmitting one or more symbols conveying information based upon the codeword.

Other aspects, features, and embodiments of the disclosure will become apparent to those of ordinary skill in the art upon reviewing the following description.

BRIEF DESCRIPTION OF THE DRAWINGS

FIG. 8 is a flowchart of an example method of systematic LDPC encoding in accordance with aspects of the disclosure.

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
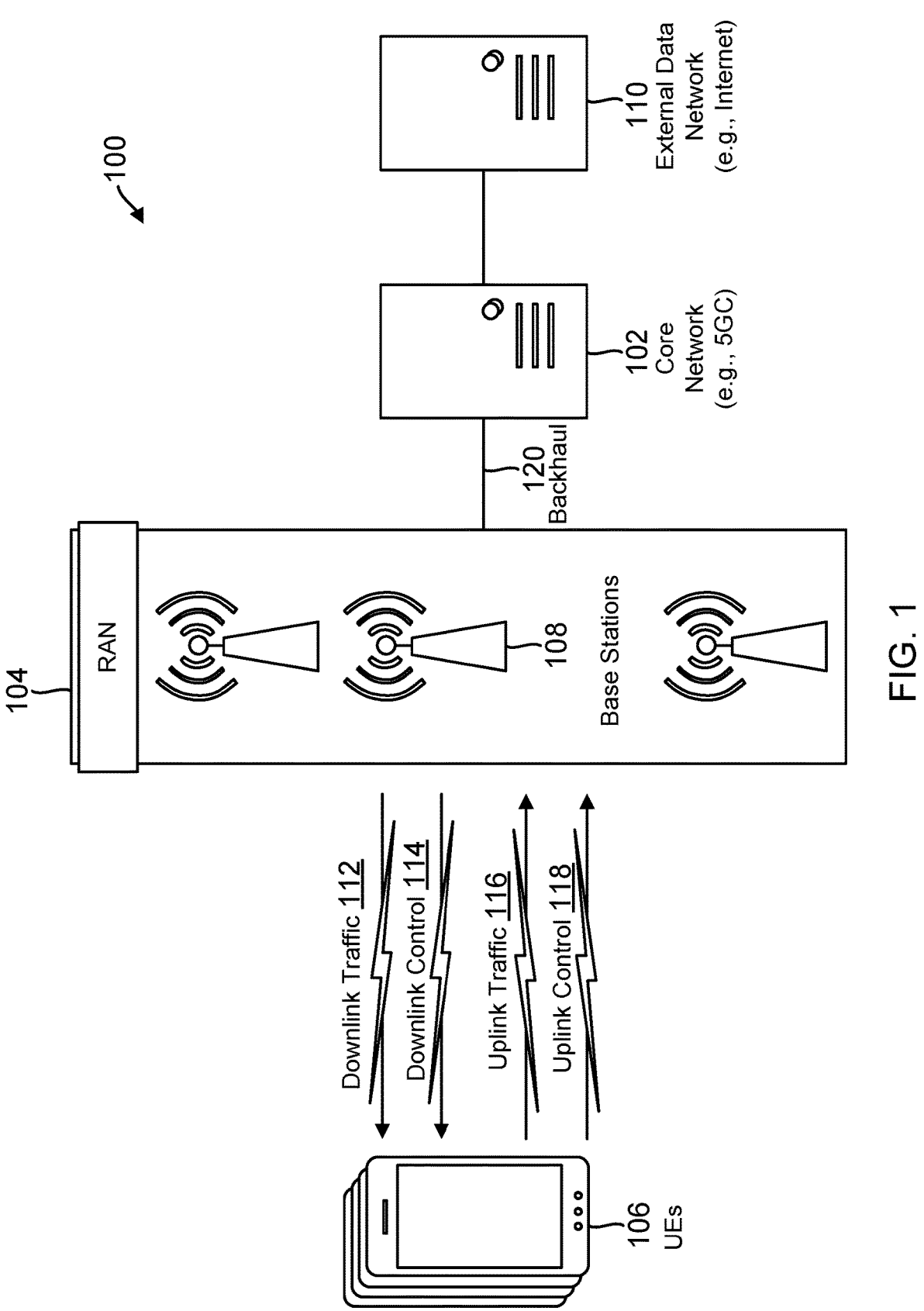
FIG. 1 illustrates an example network of communication devices configured for systematic LDPC encoding in accordance with aspects of the disclosure.

A low-density parity-check code is encodable, i.e., the parity bits may be unambiguously determined from the information bits according to a low-density parity-check matrix. There are many ways to implement a low-density parity-check matrix for a low-density parity-check encoding. Although all these various approaches may result in encodability, the coding efficiency is also important. If the choice of the low-density parity-check matrix results in the encoder having to perform many operations to calculate the parity bits, the resulting encoding is disadvantageous compared to another low-density parity-check matrix selection in which the parity bits may be computed using fewer operations. The same desire for efficiency applies to the LDPC decoder. Through much effort and study of the various ways to select the low-density parity-check matrix, the 5G protocol has standardized a quasi-cyclic LDPC in which the protograph is denoted as a base graph (either BG1 or BG2). Based upon a lifting factor Z, each element in the base graph is replaced by a corresponding $Z{\times}Z$ permutation matrix to form the low-density parity-check matrix. Because 5G LDPC is quasi-cyclic, the various (non-zero) $Z{\times}Z$ permutation matrices are related to each other through a circular shift. This may be advantageous with respect to reducing the memory requirements of the encoder and decoder and reducing the calculation complexity and number of required operations.

It is thus desirable for a communication device such as a user equipment or a base station to continue to use either BG1 or BG2 with respect to encoding and decoding. But as discussed earlier, this use of 5G LDPC came at the cost of puncturing information bits (and thus puncturing the corresponding amplitudes), which increases the shaping gap that would otherwise be reduced by the use of techniques such as probabilistic amplitude shaping.

As will be explained further herein, LDPC encoders and decoders are disclosed that in some instances may retain the use of the 5G base graph, but with puncturing bits other than information bits. In another instance, 5G base graphs may be altered, as discussed with respect to FIG. 5, which may also allow for puncturing bits other than the information bits. The scope of the disclosure is not limited to 5G base graphs, as any appropriate base graphs may be used, and the scope of the disclosure may be adapted to further iterations of technology beyond 5G. A communication system may thus employ LDPC in a systematic fashion. A code is denoted herein as being systematic when the information bits are not transformed or punctured but instead are retained in the transmitted codeword. The following implementations may be employed in any application in which a systematic encoding of LDPC is desired. Although the following discussion will be directed to the use of a systematic LDPC encoding in the context of probabilistic amplitude shaping, it will thus be appreciated that the LDPC encoding and decoding discussed herein is applicable to any systematic forward error correction (FEC) application.

Before the systematic encoding of LDPC is discussed in more detail, an example communication system in which communication devices may implement the systematic encoding of 5G LDPC will first be discussed. Turning now to FIG. 1, various aspects of the present disclosure are illustrated with reference to a wireless communication system 100. The wireless communication system 100 includes three interacting domains: a core network 102, a radio access network (RAN) 104, and an external data network 110. RAN 104 includes a plurality of base stations 108 and a plurality of user equipment (UE) 106. Each UE 106 or base station 108 is an example of a network device configured to perform systematic encoding of 5G LDPC as discussed further herein.

By virtue of the wireless communication system 100, each UE 106 may be enabled to carry out data communication with the external data network 110, such as (but not limited to) the Internet. The RAN 104 may implement any suitable wireless communication technology or technologies to provide radio access to each UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network device in a radio access network responsible for radio transmission and reception in one or more cells to or from a UE 106. In different technologies, standards, or contexts, a base station 108 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The base station 108 may conform to any appropriate architecture, such as aggregated or disaggregated. An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more radio units. Each of the CU, DU and radio unit also may be implemented as virtual units, i.e., a virtual central unit (VCU), a virtual distributed unit (VDU), or a virtual radio unit (VRU).

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may include an apparatus that provides a user with access to network services.

UEs 106 may include a number of components configured for wireless communication; such components can include antennas, antenna arrays, RF chains, amplifiers, one or more processors, etc. electrically coupled to each other. For example, some non-limiting examples of a mobile apparatus (mobile network device) include a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A network device may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A network device may additionally be a digital home or smart home device such as a home audio, video, and/or multimedia device, an appliance, a vending machine, intelligent lighting, a home security system, a smart meter, etc.

Wireless communication between RAN 104 and a UE 106 may be described as utilizing an air interface. Transmissions over the air interface from a base station 108 to one or more UEs 106 may be referred to as downlink (DL) transmission. In accordance with certain aspects of the present disclosure, the term downlink may refer to a point-to-multipoint transmission originating at a base station 108. Another way to describe this scheme may be to use the term broadcast channel multiplexing. Transmissions from a UE 106 to a base station 108 may be referred to as uplink (UL) transmissions. In accordance with further aspects of the present disclosure, the term uplink may refer to a point-to-point or a point-to-multi-point transmission originating at a UE 106.

A base station 108 may thus broadcast downlink traffic 112 to one or more UEs 106. Broadly, each base station 108 is a node or device responsible for scheduling traffic in a wireless communication network, including the downlink traffic 112 and, in some examples, uplink traffic 116 and uplink control information 118 from the one or more UEs 106. On the other hand, each UE 106 is a node or device that receives downlink control information 114, including but not limited to scheduling information (e.g., a grant), synchronization or timing information, or other control information from another entity in the wireless communication network such as the base station 108.

Base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In various implementations, the air interface in the radio access network 104 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 104 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at one time the channel is dedicated for transmissions in one direction, while at other times the channel is dedicated for transmissions in the other direction, where the direction may change very rapidly, e.g., several times per slot. With this background information in mind, aspects of the systematic encoding of 5G LDPC disclosed herein will now be discussed in more detail.

Figure 2:
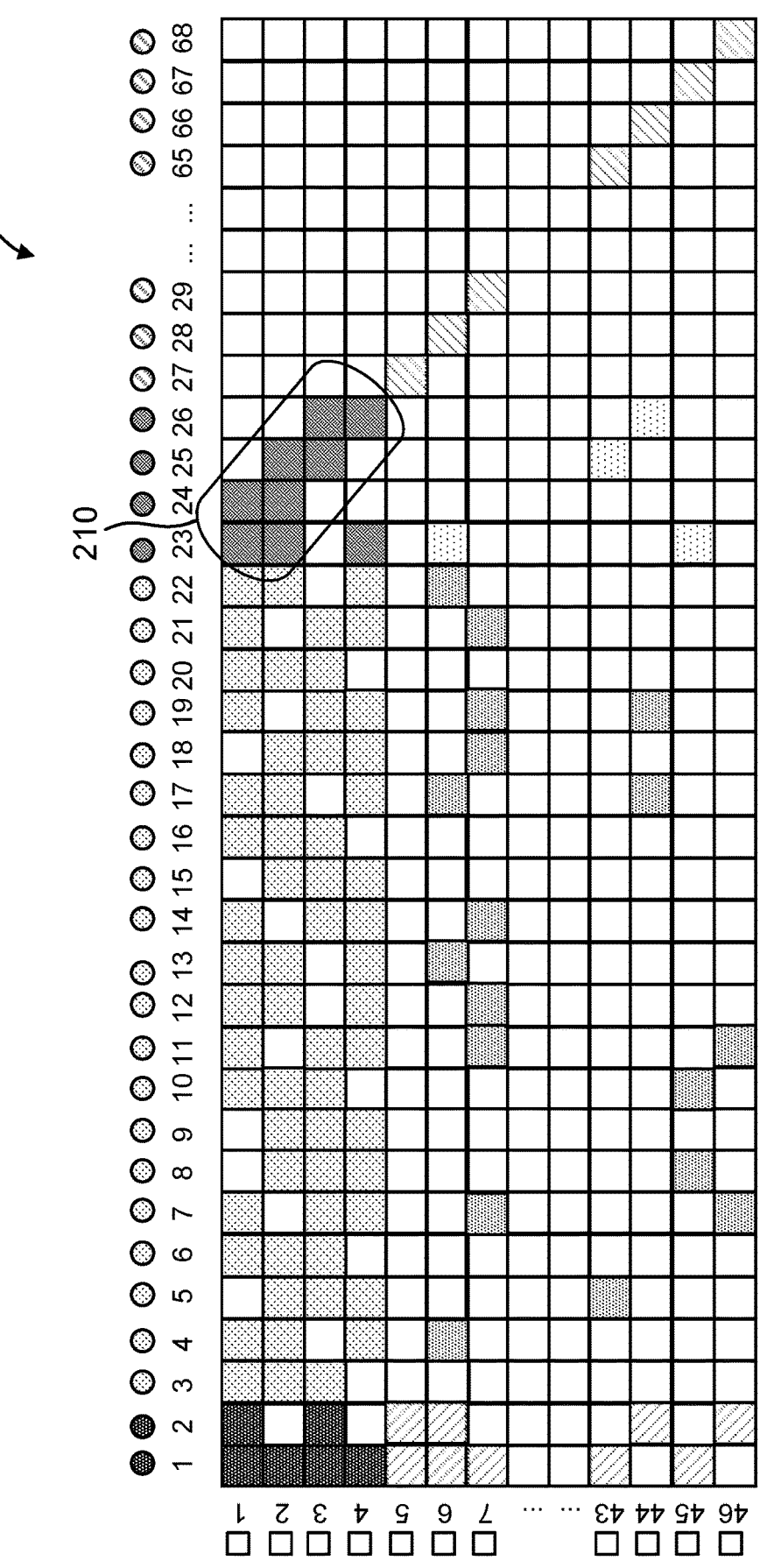
FIG. 2 illustrates base graph 1 (BG1) in which the first two columns are parity-bit columns in accordance with aspects of the disclosure.

The systematic encoding may utilize any appropriate base graph, including the 5G LDPC base graphs or base graphs resulting from modifications of the 5G LDPC base graphs or new base graphs. BG1 is shown in FIG. 2 as a matrix 200. Depending upon the coding rate, the BG1 matrix 200 can be up to 46 rows by 68 columns. In conventional (information-bit-punctured) encoding using BG1, columns 1 through 22 are information-bit columns. Columns 23 through 68 are parity-bit columns. The first four rows and first 26 columns form a core of the BG1 matrix. The parity bits encoded by columns 23-26 are thus core parity bits whereas parity bits encoded by columns 27 through 68 are denoted as extension parity bits. Note that the first four rows of core parity-bit columns 23 through 26 form a "double diagonal" matrix pattern 210 that leads to an efficient calculation of the corresponding core parity bits. With the core parity bits calculated during normal 5G operation, the desired number of extension parity bits are then readily calculated due to the "main diagonal" matrix pattern for the extension parity-bit columns.

As noted above, in the BG1 matrix, the indices of the core columns are integers ranging from 1 to 26. In the BG2 matrix, the core is formed by the first four rows and the first fourteen columns. The set P for BG2 would thus include integers 11-14. As explained in more detail below, a base graph (e.g., BG1, BG 2, so some other base graph) may be lifted by a lifting factor Z. In that regard, the lifting factor Z is produced by a function $Z(a,k)=a*2^k$, where a is an integer multiplier that is selected from the set of {2, 3, 5, 7, 9, 11, 13, 15} and k is an integer that is greater than or equal to zero and less than or equal to 7. The lifting factors Z that all have the same integer multiplier form what is denoted herein as a Z class.

The determination of the core parity bits in some instances may use only the core of the base graph. The resulting lifting by the lifting factor Z forms a lifted core parity-check matrix. Each non-zero element in the core of the base graph is then replaced by a Z×Z permutation matrix. A zero element is replaced by a Z×Z matrix of all zeroes. A unit element (equal to 1) is replaced by a cyclically shifted identity Z×Z matrix. As an element increments from unity, the identity matrix is cyclically shifted accordingly from the identity matrix to form the corresponding Z×Z permutation matrix. As used herein, the term "permutation matrix" (also referred to as a lifting matrix) thus refers only to the identity Z×Z matrix or cyclic shifts of the identity Z×Z matrix. The permutation matrix can thus be represented as $P^i$, where $P^i$ is the Z×Z permutation matrix such that, for each column index $j \in \{0, 1, \ldots, Z-1\}$, the (j+i mod Z)th element of that column is 1. All the remaining column elements are zero. If the element being replaced by the Z×Z permutation matrix is in an information-bit column, the element is multiplied by Z corresponding information bits during the LDPC encoding. It may be computationally efficient to represent these Z information bits and the permutation matrices by corresponding binary polynomials. With regard to forming a binary polynomial, consider, for example, a binary word 1001. A binomial polynomial of such a word is the binary vector $x^3+0*x^2+0*x+1$. It can be shown that the modulo multiplication of a binary polynomial with a monomial $x^i$ is equivalent to a cyclic shift of the binary polynomial by i, where i is a positive integer.

Quasi-cyclic LDPC codes, or cyclically lifted LDPC codes, with a lifting factor Z, can be viewed as codes over the ring $\mathscr{F}_2(x)$ of binary polynomials modulo $x^2+1$. With that binary polynomial convention in mind, the core of BG1 or BG2 may be represented by a matrix H that is of size 4 rows by r columns, where r is 26 for BG1 and r is 14 for BG2. From the matrix H, a matrix H(x) is the lifted matrix over the ring $\mathscr{F}_2(x)$ such that $H_{i,j}(x)=x^{H_{i,j}}$ if $H_{i,j}$ is not equal to −1 and $H_{i,j}(x)=0$ if $H_{i,j}$ is equal to −1.

Figures 3, 4:
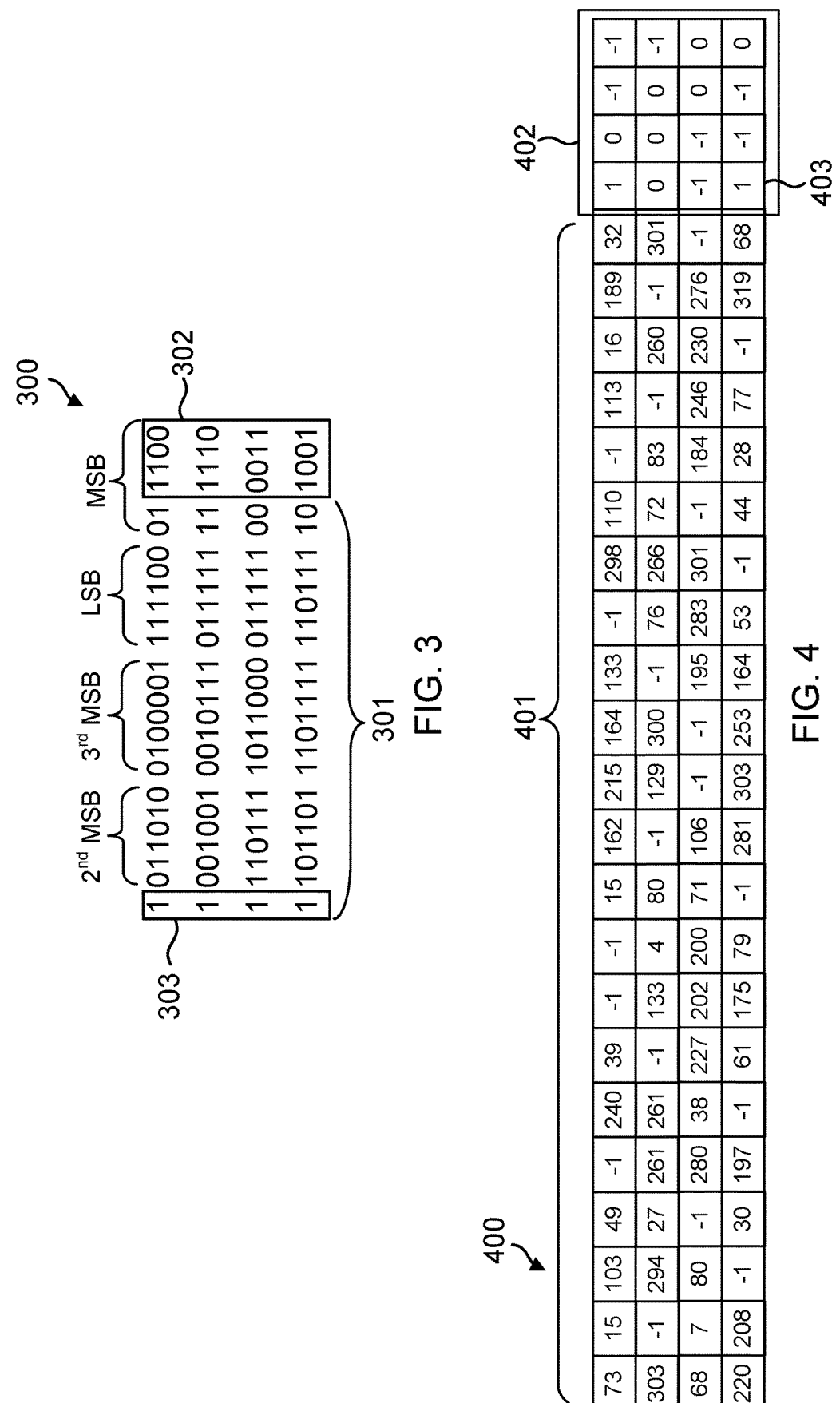
FIG. 3 is an illustration of an example base graph in accordance with aspects of the disclosure.
FIG. 4 is an illustration of an example parity check matrix in accordance with aspects of the disclosure.

FIG. 3 is an illustration of an example base graph 300, or at least the core of a base graph, which may be used in some aspects. The base graph 300 has columns (also called "nodes") 301, which correspond to information bits. Columns (or "nodes") 302 correspond to parity bits. In traditional LDPC, the column 303 is punctured. Of course, the scope of the disclosure is not limited to base graph 300, as any appropriate base graph may be used.

FIG. 4 is an illustration of an exemplary parity check matrix 400, which is associated with the BG1 matrix, according to one example. Parity check matrix 400 results from lifting a base graph, but in this example that lifted base graph does not correspond to base graph 300 just for ease of illustration. The columns 401 correspond to information bits, and the columns 402 correspond to parity bits. Parity check matrix 400 is merely an example, and it is understood that the scope of the disclosure may include any appropriate parity check matrix, resulting from lifting any appropriate base graph.

The illustration of FIG. 4 shows a shorthand representation, which replaces the permutation matrices with notations that represent a particular cyclic shift. For instance, the element in the top left-hand corner is 73, which indicates a cyclic shift of 73 to an identity Z×Z matrix. Further in the example of FIG. 4, "−1" corresponds to "0" in the base graph. And both "0" and "1" correspond to the element "1" in the base graph (indicating there is an edge connecting the corresponding variable column and the parity column in the base graph). Further, "0" indicates the cyclic shifting matrix is an identity matrix (i.e., 0 cyclic shift, or no cyclic shift), and "1" indicates the cyclic shifting matrix is obtained by shifting the columns of the identity matrix (to the right) by 1. Similarly, various examples may include an arbitrary shift amount between 0 and Z−1.

As noted, the illustration of FIG. 4 is a shorthand representation, and the shorthand format allows for the parity check matrix to be illustrated as size 4*26. By contrast, if the parity check matrix 400 were written out in its entirety, it would have size (4*Z)*(26*Z), attributable to the Z×Z lifting. Thus, the left-most column of parity check matrix 400 [73, 303, 68, 220], when written out in longhand form, would be (4*Z) rows by Z columns. The following example uses H to represent a parity check matrix generated by lifting a base graph by replacing each non-zero entry in the base graph with a Z×Z circulant lifting matrix (also called a permutation matrix). In conventional LDPC encoding, the information bits $s_0, \ldots, s_{K_b}^{-1}$, are encoded according to Eq. (1).

$$H \cdot [s_0, s_1, s_{K_b-1}, p_{K_b}, \ldots, p_{K_b+3}]^T = 0 \qquad \text{Eq. (1)}$$

In Eq. (1), each $s_0, \ldots, s_{K_b-1}$ denotes a length-Z vector of systematic bits for encoding, and $K_b$ denotes the quantity of columns in the base graph that correspond to information variable columns. Also, each vector $p_{K_b}, \ldots, p_{K_b}^{+3}$ is a length-Z vector of parity bits.

In conventional LDPC encoding, the Z bits in $s_0$ are punctured, and instead 4Z parity bits $p_{K_b}, \ldots, p_{K_b+3}$ will be generated from the LDPC code and transmitted. Of course, four is the number of rows in the core part of the graph and is only an example. By contrast, various examples of the present disclosure replace $s_0$ with some properly determined length-Z auxiliary vector $a_0$ such that when encoded according to the LDPC code, the first Z parity bits $p_{K_b}$ bits (that corresponds to the degree-3 terminating column in the degree-2 accumulative chain) will be the same as the systematic bits $s_0$. Hence, the Z bits in $s_0$ are "unpunctured". Put another way, some examples "revert" the parity check matrix in a way that, after encoding, the systematic bits $s_0$ appear as the first first Z parity bits from the encoder. The first Z parity bits $(p_{K_b})$ correspond to the start of the accumulative chain of the base graph, and the accumulative chain has a special structure that eases the encoding as well as "reverting" the PCM. An example accumulative chain is shown above as item 210 of FIG. 2.

An example includes summing the matrices in the first Z columns of the lifted parity check matrix to get Eq. (2):

$$Q_{Z \times Z} \cdot a_0 = s'_0 + b \qquad \text{Eq. (2)}$$

The matrix $Q_{Z \times Z}$ conforms to Eq. (3):

$$Q_{Z \times Z} = P_{00} + P_{10} + P_{20} + P_{30} \qquad \text{Eq. (3)}$$

Q denotes the Z×Z matrix obtained by summing the matrices in the first column of the lifted PCM in the shorthand representation in FIG. 4. In Eq. (3), $P_{00}$ refers to the lifting matrix in the first Z rows and first Z columns of the lifted parity check matrix H. In the example of FIG. 4, it corresponds to the lifting matrix having the shorthand 73. The lifting matrix $P_{10}$ is in the first Z columns and second Z rows of $\underline{H}$, the lifting matrix $P_{20}$ is in the first Z columns and third Z rows of H, and the lifting matrix $P_{30}$ is in the first Z columns and fourth Z rows of H and has the shorthand 220 in the example of FIG. 4.

Further in Eq. (3), $a_0$ denotes a bit vector of length Z to calculate from $$s'_0 + b \text{ and } Q_{Z \times Z}, \text{ and } s'_0$$

denotes the cyclically-shifted version of the length-Z vector containing shaped information systematic bits $s_0$. In this example, the shifting amount is defined by the degree-3 column corresponding to the first parity column (degree-3 column in the accumulative chain). In the example of FIG. 4, the first parity column is shown by reference 403, and it may also be referred to as a terminating column. The term "accumulative chain" may sometimes be used to refer to the entirety of the parity columns 402 or only to the subsection of the parity columns 402 that do not include the terminating column 403. Further in Eq. (3), b is another length-Z vector which is determined based on the parity check matrix of the LDPC code and the remaining set of information bits are encoded together with $s_0$. Note that, in Eq. (3), the other parity bits $p_{K_b+1}, \ldots, p_{K_b+3}$ do not appear because they may be calculated through back substitution by virtue of the degree-2 accumulative chain structure.

Continuing with the example, $a_0$ may be calculated by Eq. (4) once $Q_{Z \times Z}$ and b are determined $$a_0 = Q_{Z \times Z}^{-1} \cdot (s'_0 + b) \qquad \text{Eq. (4)}$$

Note that the bits do are not parity bits, though they are calculated using the information bits. For the purposes of this example, the bits in the length-Z vector $a_0$ may be referred to as auxiliary bits. In any event, the auxiliary bits are punctured and so are not transmitted.

The encoding employs back substitution to compute the rest of the parity bits in the length-Z vectors $p_{K_b+1}, \ldots, p_{K_b+3}$. For instance, $p_{K_b+1}$ may be computed from the first row of the parity check matrix using Eq. (5), the length-Z vector $p_{K_b+2}$ may be computed subsequently from the second row of the parity check matrix using Eq. (6), and the length-Z vector $p_{K_b+3}$ may be computed subsequently from the third row of the parity check matrix using Eq. (7). Once the length-Z vectors $p_{K_b+1}, \ldots, p_{K_b}+3$ have been computed, the codeword may be represented as: $[a_0, s_1, \ldots, s_{K_b-1}, s_0, p_{K_b+1} \cdots, p_{K_b+3}]$.

$$p_{K_b+1} = P_{00}a_0 + P_{01}s_1 + \ldots + P_{0,K_b-1}s_{K_b-1} + I \cdot s_0 \qquad \text{Eq. (5)}$$

$$p_{K_b+2} = P_{10}a_0 + P_{11}s_1 + \ldots + P_{1,K_b-1}s_{K_b-1} + P_{1,K_b}s_0 + p_{K_b+1} \qquad \text{Eq. (6)}$$

$$p_{K_b+3} = P_{30}a_0 + P_{31}s_1 + \ldots + P_{3,K_b-1}s_{K_b-1} + P_{3,K_b}s_0 \qquad \text{Eq. (7)}$$

Put another way, according to the present example, the encoder computes $a_0$ and the rest of core parity bits $p_{k_b+1}, \ldots, p_{k_b+3}$ such that Eq. (8) is satisfied. The bits in vector $a_0$ are punctured and, thus, not transmitted.

$$H \cdot [a_0, s_1, \ldots, s_{K_b-1}, s_0, p_{K_b+1} \ldots, p_{K_b+3}]^T = 0 \qquad \text{Eq. (8)}$$

The decoder may decode the codeword according to the parity check matrix H to obtain systematic bits $[a_0, s_1, \ldots, s_{K_b-1}]$, and then re-encode to get so or decode $[s_1, \ldots, s_{K_b-1}, s_0]$ directly using message passing on the parity check matrix.

Figure 5:
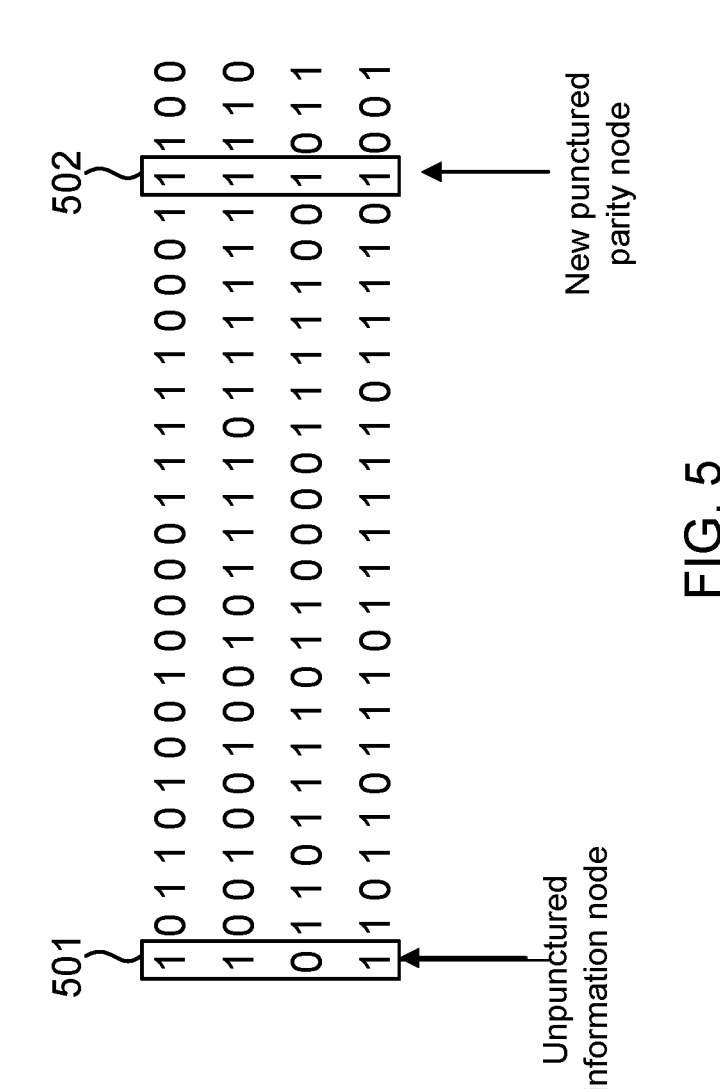
FIG. 5 is an illustration of an example base graph in accordance with aspects of the disclosure.

In the example above, the encoder may use a parity check matrix that has been unmodified, such as a parity check matrix based on BG1 or BG2 or another appropriate base graph. A different example may instead redefine the base graph by permuting the punctured column and the first parity column of the original base graph. In the example of FIG. 5, the permuting includes switching the places of the terminating column 501 and the punctured column 502 so that the punctured column 502 is at the leftmost position of the parity columns and the terminating column 501 is at the leftmost position of the information-bit columns. In other words, the punctured column 502 is at the leftmost position of the parity columns, and it corresponds to a parity bit column and will be punctured. The terminating column 501 is at the leftmost position of the information bit columns, and it corresponds to an information column and will not be punctured. A lifted parity check matrix resulting from this modified base graph may be referred to as $\hat{H}$.

In this example employing $\hat{H}$, $p_{K_b}$ includes auxiliary bits and plays the same role as $a_0$ in the previous example. The length-Z vector $p_{K_b}$ may be calculated using Eq. (9).

$$p_{K_b} = Q_{Z \times Z}^{-1} \cdot (s'_0 + b) \qquad \text{Eq. (9)}$$

The remaining parity bits may be calculated according to Eq. (10) and back-substitution, as in Eq. (5)-(7). The bits in vector $p_{K_b}$ are punctured and, thus, not transmitted.

$$\hat{H} \cdot [s_0, s_1, \ldots, s_{K_b-1}, s_0, p_{K_b}, \ldots, p_{K_b+3}]^T = 0 \qquad \text{Eq. (10)}$$

In the examples described above with respect to FIGS. 3-5: 1) Information bits are not punctured, 2) only one node is punctured, and it is placed within the set of parity columns, 3) the terminating column, which terminates the degree-2 accumulative chain, corresponds to an information-bit column rather than a parity column as in legacy LDPC encoding, and 4) a base graph includes an auxiliary bit column located either between the information-bit columns and the parity-bit columns (as in FIG. 3) or located at the leftmost column (as in FIG. 5). In an alternative way to represent the base graph, the punctured column may be placed at the after the parity-bit columns, i.e., in the rightmost position of the base graph. A possible advantage of the examples described above is that all information bits are transmitted, and none of the information bits are punctured. Such examples may preserve the beneficial shaping provided to the information bits by probabilistic amplitude shaping (PAS), thereby reducing the "shaping gap" and preserving spectral efficiency. However, the scope of the disclosure includes applying the principles described above to uniform modulation (e.g., uniform QAM) as well.

Another possible advantage provided by the examples above is that transmitting all information bits may allow the receiver to make a hard decision to decode all information bits based on channel log likelihood ratios (LLRs) without using traditional decoding tools. In other words, when the decoder detects that the channel signal-to-noise ratio (SNR) is higher than a threshold, then the decoder may just simply make a hard decision for the information bits rather than performing decoding. By contrast, for current NR BG1, the receiver uses decoding techniques regardless of SNR because the decoder must reconstruct the punctured information bits.

Various aspects of the disclosure include designing the cyclic shift values (which are also known as lifting values for proto-graph LDPC codes) for the LDPC codes such that it makes encoding simpler and more efficient. According to Eq. (4) and Eq. (9), the matrix $Q_{Z \times Z}$ should be invertible. Furthermore, various examples may increase the power use efficiency and computational efficiency of a transmitter by making $Q_{Z \times Z}$ computationally easy to invert. As noted above, quasi-cyclic LDPC codes, or cyclically lifted LDPC codes, with a lifting factor Z, can be viewed as codes over the ring $\mathscr{F}_2(x)$ of binary polynomials modulo $x^Z+1$. In this case, the $Q_{Z \times Z}$ can be written as $$Q(x) = x^{k_1} + x^{k_2} + \ldots + x^{k_d}, \qquad \text{Eq. (11)}$$

where each number $k_1, \ldots, k_d$ corresponds to a respective cyclic shift value of one of the d edges connecting to the punctured column. For instance, in FIG. 5, the punctured column is a length-4 vector of values 1, 1, 1, 1. Totaling those values gives four edges, so d is equal to 4. The scope of the disclosure may be scaled to include any appropriate number of edges.

In one example, the cyclic shift values $k_1, \ldots, k_d$, connecting to the punctured column may be designed such that $Q_{Z \times Z}$ is invertible over $\mathscr{F}_2(x)$ modulo $x^Z+1$ and such that $$Q_{Z \times Z}^{-1}$$

has simpler forms. For instance, $$Q_{Z \times Z}^{-1}$$

may contain smaller weights, may contain a smaller number of non-zero values, or may be factorized into simpler factors. Examples of simpler factors may include $(1+x)(1+x^2)$ or the like.

Generally, without any special structure, $Q^{-1}(x)$ has approximately Z terms, assuming it is invertible. One way to make the inversion more computationally easy may include requiring the $k_1, \ldots, k_d$ to have a common divisor L (e.g., L=Z/8), where 8>d. A common divisor L may make inverting Q(x) more computationally easy, as it effectively reduces the quantity of terms from Z to Z/L.

An example is $x^0+x^{2L}+x^{3L}+x^{4L}+x^{5L}+x^{6L}+x^{7L}$, whose inverse is $x^{7L} \bmod x^{8L}+1$. Inverting Q(x) above is equivalent to inverting $x^0+x^2+x^3+ \ldots +x^7 \bmod x^{8+1}$. Some examples may use this principle to design cyclic shift values for Z that contain factors of powers of 2. For example, $384=3*2^7$; L in this case 384/8. Thus, a design for Z=8 may be easily generalized to Z=L*8 for arbitrary integer L.

Generally, when there is one set of $k_1, \ldots, k_7$ for Z, then it may be straightforward to extend the design to 2Z, by e.g., setting $$k_i' = 2k_i.$$

For the example above, once $k_1, \ldots, k_7$ for Z=8 is determined, it also applies to all factors 8*L.

Another property of binary polynomials is that $f(x)^2=f(x^2)$. As a consequence, the following is also true:

$$\left(1+x^{\frac{Z}{2}}\right)^2 + \left(1+x^{\frac{Z}{4}}\right)^4 = \left(1+x^{\frac{Z}{8}}\right)^8 = 0.$$

Thus, Eq. (12) applies to Q(x), and Eq. (13)-(14) can be derived therefrom.

$$Q(x) = x^{k_1} + \left(x^{k_2} + x^{k_3} + x^{k_4}\right) \cdot \left(1 + x^{\frac{Z}{2}}\right) \qquad \text{Eq. (12)}$$

$$\Rightarrow Q(x)^2 = x^{2k_1}, Q(x)^2 = Q(x)Q(x) \Rightarrow Q^{-1}(x) = Q(x)Q(x^2)^{-1} \qquad \text{Eq. (13)}$$

$$\Rightarrow Q^{-1}(x) = Q(x)x^{Z-2k_1} \qquad \text{Eq. (14)}$$

Therefore, in a general example, the encoder may select $Q_{Z \times Z}$ so that a condition set forth in Eq. (15) is satisfied, where k is an integer.

$$Q^{-1}(x) = Q(x)x^{k_1} \qquad \text{Eq. (15)}$$

As a result, the matrix $Q_{Z \times Z}$ may be computationally easy to invert. In another more specific example, the encoder may select $Q_{Z \times Z}$ so that Eq. (14) is satisfied, which may also be computationally easy to invert.

In yet another example, $k_1, k_2, k_3, k_4$ may be selected so that no term cancels in Eq. (16). From Eq. (16), Eq. (17)-(18) may be derived.

$$Q(x) = x^{k_1} + x^{k_2}\left(1 + x^{\frac{Z}{2}}\right) + x^{k_3}\left(1 + x^{\frac{Z}{4}}\right) + x^{k_4}\left(1 + x^{\frac{Z}{8}}\right) \qquad \text{Eq. (16)}$$

$$\Rightarrow Q(x)^8 = x^{8k_1} \qquad \text{Eq. (17)}$$

$$\Rightarrow Q^{-1}(x) = Q(x^4)Q(x^2)Q(x)x^{Z-8k_1} \qquad \text{Eq. (18)}$$

Therefore, the encoder may select the matrix $Q_{Z \times Z}$ so that Eq. (18) is satisfied, which may lead to relatively easy inversion.

Figure 6:
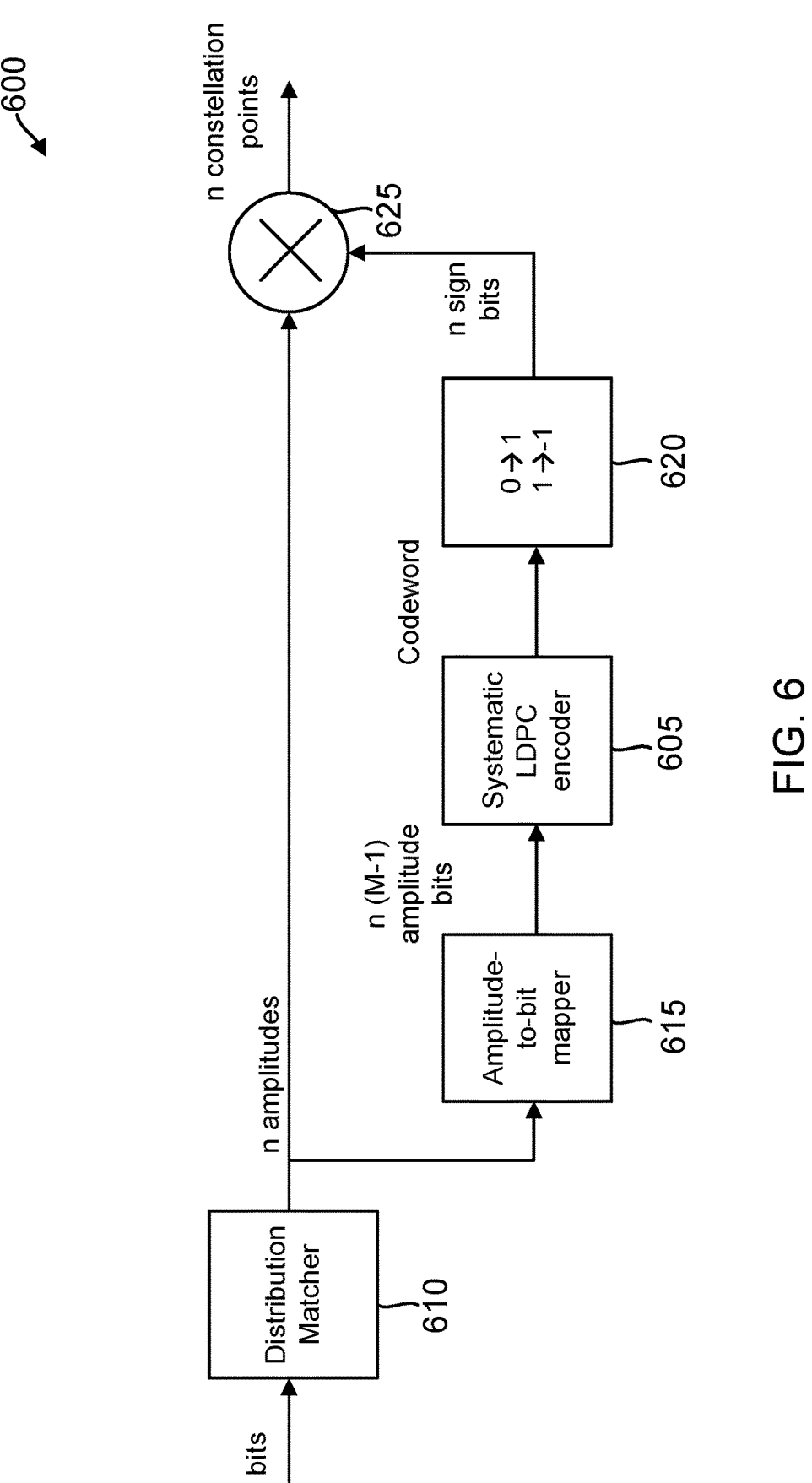
FIG. 6 is a diagram of a transmitter with probabilistic amplitude shaping and systematic LDPC encoding in accordance with aspects of the disclosure.

An example transmitter 600 including an LDPC encoder 605 is shown in FIG. 6. The LDPC encoder 605 may perform the encoding actions described with respect to FIGS. 2-5 and 8, including calculating a length-Z vector of auxiliary bits and generating a codeword that includes the auxiliary bits.

A digital baseband source (not illustrated) provides k bits to a probabilistic amplitude shaping distribution matcher 610, where k is a plural positive integer. Distribution matcher 610 generates n amplitudes from the k bits, where n is a plural positive integer. In one example, distribution matcher 610 may generate the n amplitudes according to a $2^M$-ary amplitude-shift-keyed (ASK) modulation, where M is a positive plural integer relating to the modulation order. An amplitude-to-bit mapper 615 maps each amplitude into M−1 amplitude bits. There are thus n(M−1) amplitude bits provided to systematic LDPC encoder 605. These amplitude bits are the information bits for LDPC encoder 605. Should BG1 be selected, the quantity n(M−1) may equal 22*Z although this need not be exact as accommodated through padding of information bits. Similarly, if BG2 is selected, the quantity n(M−1) may equal 10*Z. The scope of the disclosure is not limited to BG1 and BG2, as any appropriate base graph may be used.

In transmitter 600, there are n amplitudes, so the ASK phasing of each amplitude uses n parity bits. In this ASK phasing, a binary zero parity bit may be mapped in a mapper 620 to a 0-degree (multiplication by 1) phase whereas a binary one parity bit may be mapped to a 180-degree (multiplication by −1) phase. A mixer 625 mixes each amplitude with its phase to produce n constellation points. The information may be transmitted as one or more symbols.

The systematic LDPC encoder 605 generates the parity bits used for the phasing of the n amplitudes. As described above, the LDPC encoder 605 computes both the auxiliary bits and the parity bits, which are then combined with the information bits to form a codeword. The transmitter 600 may puncture the length-Z vectors that include the auxiliary bits.

Transmitter 600 may be included in a communication device such as either a UE 106 or a base station 108 in wireless communication system 100 that performs the systematic encoding of LDPC.

Figure 7:
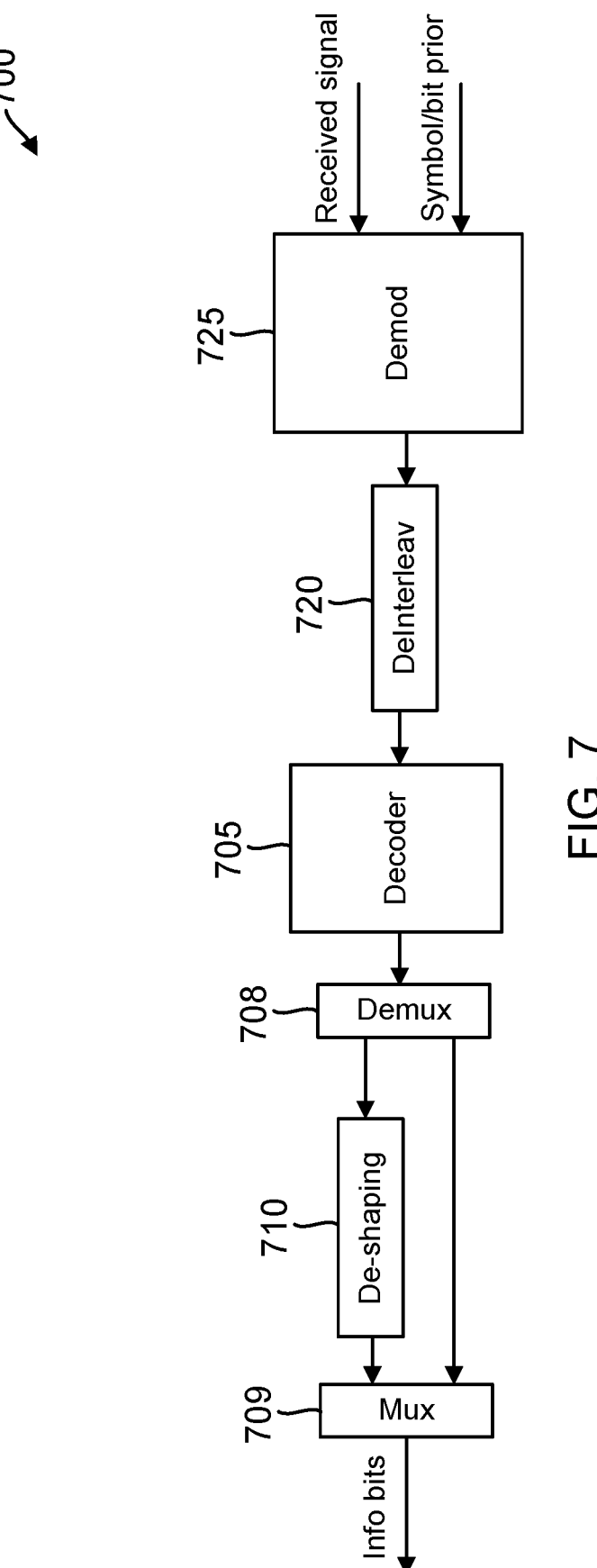
FIG. 7 illustrates a systematic decoder in accordance with an aspect of the disclosure.

An example receiver 700 including an LDPC decoder 705 is shown in FIG. 7. The LDPC decoder 705 may decode the codewords described above with H and Ĥ as examples. The receiver 700 receives the signal, which includes one or more symbols, as discussed above with respect to FIG. 6. The demodulator 725 and interleaver 720 generate a codeword, which includes parity bits and information bits. The decoder 705 receives the codeword and, in one example, decodes the codeword according to the parity check matrix to obtain systematic bits $[a_0, s_1, \ldots, s_{K_b-1}]$, and then re-encode to get $s_0$. In another example, the decoder may simply decode $[s_1, \ldots, s_{K_b-1}, s_0]$ directly using message passing on the parity check matrix. Directly decoding may be an option when there is acceptable signal quality, such as when SNR is high. The decoder 705 may also compute amplitudes from the information bits $[s_1, \ldots, s_{K_b-1}, s_0]$, and those amplitudes may be demultiplexed (at demultiplexer 408) and de-shaped at item 410 to generate information bits, which are multiplexed at multiplexer 409. Receiver 700 may be included in a communication device such as either a UE 106 or a base station 108 in wireless communication system 100 that performs the decoding of LDPC.

With the selection of an appropriate base graph and an appropriate lifting factor Z being provided, transmitter 600 may proceed as summarized in the flowchart of FIG. 8.

FIG. 8 is an illustration of example method 800 for encoding and transmitting information. The actions of FIG.

8 may be performed by a transmitter, such as transmitter 600 of FIG. 6. More specifically, the functionality associated with the actions of FIG. 8 may be implemented using hardware, firmware, and/or software. For instance, the functionality associated with the actions of FIG. 8 may be implemented on a computer readable medium having computer-executable code, and when that computer-executable code is executed by one or more processors, the one or more processors may perform the actions of FIG. 8.

At action 801, the transmitter selects a matrix $Q_{Z \times Z}$ that is equal to a sum of a set of Z×Z lifting matrices in a first column of a low-density parity-check matrix. The matrix $Q_{Z \times Z}$ is invertible in this example. Selecting the matrix $Q_{Z \times Z}$ may include any appropriate technique to reduce a number of processing operations required for inversion of the matrix $Q_{Z \times Z}$. In one example of selecting the matrix $Q_{Z \times Z}$, it is selected so that the inverse $Q^{-1}(x)$ has simpler forms, e.g., either it contains smaller weights or a smaller quantity of non-zero values, or it can be factorized into simpler factors, such as $(1+x)(1+x^2)$.

Continuing with action 801 in other examples, selecting the matrix $Q_{Z \times Z}$ may include satisfying conditions, such as those set forth in Eqs. (14)-(15) and (18).

At action 802, the transmitter lifts a base graph according to a value of Z and selects the matrix $Q_{Z \times Z}$ to create a low-density parity check matrix. As noted above, in some examples, the matrix $Q_{Z \times Z}$ refers to a sum of the lifting matrices in a first column of a parity check matrix. Therefore, each of those lifting matrices may populate the first column of the parity check matrix. The base graph may be selected from BG1 or BG2 or from any other appropriate base graph.

At action 803, the transmitter encodes a plurality of $K_b$*Z information bits into a codeword of $(K_b+Y)$*Z bits according to the low-density parity-check matrix, wherein $K_b$ is a quantity of information-bit columns in the base graph associated with the low-density parity-check matrix. For instance, in one example using BG1, $K_b$ is 22, and Y refers to a number of parity columns (four).

In one example, a first Z bits of the codeword are auxiliary bits and a subsequent $(K_b+Y-1)$*Z bits of the codeword include the $K_b$*Z information bits and $(Y-1)$*Z additional parity bits, wherein Y is a positive integer. An example of encoding in this manner is discussed above with respect to Eq. (8) and FIGS. 3-4.

In another example, a first $K_b$*Z bits of the codeword are information bits and a subsequent $(Y-1)$*Z bits of the codeword are parity bits, further wherein Z bits between the information bits and the parity bits are auxiliary bits. Y is a positive integer. Such an example is discussed above with respect to Eq. (10) and FIG. 5.

Once the information bits are encoded, they may be processed, as discussed above further with respect to FIG. 6. Action 804 may include transmitting one or more symbols conveying information based upon the codeword.

The scope of the disclosure is not limited to the specific actions of FIG. 8. Rather, one or more actions may be added, omitted, rearranged, or modified. For instance, actions 801-804 may be repeated as often as appropriate to transmit a desired amount of information. Furthermore, other actions (not shown) may include receiving the transmitted constellation, performing demodulation and de-entered, further performing decoding and de-shaping to generate binary bits that represent data.

The disclosure will now be summarized in a series of clauses:

Clause 1. A wireless communication device, comprising:
an encoder configured to encode a plurality of $K_b$*Z information bits into a codeword of $(K_b+Y)$*Z bits according to a low-density parity-check matrix, wherein $K_b$ is a quantity of information-bit columns in a base graph associated with the low-density parity-check matrix, wherein a first Z bits of the codeword are auxiliary bits and a subsequent $(K_b+Y-1)$*Z bits of the codeword include the $K_b$*Z information bits and $(Y-1)$*Z additional parity bits, wherein Z is a lifting factor of the low-density parity-check matrix, and wherein Y is a positive integer.

Clause 2. The wireless communication device of clause 1, wherein the encoder is included within a transmitter configured to puncture the first Z bits of the codeword and to transmit the subsequent $(K_b+Y-1)$*Z bits of the codeword.

Clause 3. The wireless communication device of any of clauses 1-2, wherein the low-density parity-check matrix is a lifted version according to Z of the base graph, and wherein a first $Z$*$K_b$ columns of the low-density parity-check matrix are information-bit columns and a subsequent $Z$*$(K_b)$ columns of the low-density parity-check matrix are parity-bit columns.

Clause 4. The wireless communication device of any of clauses 1-3, wherein the low-density parity-check matrix is a lifted version according to Z of the base graph, wherein a matrix $Q_{Z \times Z}$ is equal to a sum of a set of $Z \times Z$ lifting matrices in a Z first columns of the low-density parity-check matrix, further wherein the matrix $Q_{Z \times Z}$ is invertible.

Clause 5. The wireless communication device of clause 4, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, wherein $Z(a,c)=a$*$2^c$, where a is an integer from a set of integers having no common divisor larger than 1 and c is an integer.

Clause 6. The wireless communication device of clause 5, wherein $L=Z/a$.

Clause 7. The wireless communication device of clause 6, wherein the encoder is configured to select the $k_1, \ldots, k_d$ to have a common divisor L.

Clause 8. The wireless communication device of clause 4, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein the encoder is configured to select $Q_{Z \times Z}$ so that a condition $Q^{-1}(x)=Q(x)x^k$ is satisfied, where k is an integer Clause 9. The wireless communication device of clause 4, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein the encoder is configured to select the matrix $Q_{Z \times Z}$ so that a condition $Q^{-1}(x)=Q(x^4)Q(x^2)Q(x)x^{Z-8k_1}$ is satisfied.

Clause 10. The wireless communication device of clause 4, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein the encoder is configured to select the matrix $Q_{Z \times Z}$ to satisfy at least one of the following conditions:

$$Q^{-1}(x) = Q(x) * x^k;$$

$$Q^{-1}(x) = Q(x) * Q(x^2) * x^k;$$

$$Q^{-1}(x) = Q(x) * Q(x^2) * Q(x^4) * x^k; \text{ or}$$

$$Q^{-1}(x) = Q(x) * Q(x^2) * Q(x^4) * Q(x^8) * x^k.$$

Clause 11. The wireless communication device of clause 4, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein the encoder is configured to select the matrix $Q_{Z \times Z}$ so that $Q^{-1}(x)$ is factorized to reduce a number of terms in $Q^{-1}(x)$.

Clause 12. The wireless communication device of any of clauses 1-11, wherein the wireless communication device comprises a user equipment.

Clause 13. The wireless communication device of any of clauses 1-11, wherein the wireless communication device comprises a base station.

Clause 14. A wireless communication device, comprising:
an encoder configured to encode a plurality of $K_b$*Z information bits into a codeword of $(K_b+Y)$*Z bits according to a low-density parity-check matrix, wherein $K_b$ is a quantity of information-bit columns in a base graph associated with the low-density parity-check matrix, wherein a first $K_b$*Z bits of the codeword are information bits and a subsequent $(Y-1)$*Z bits of the codeword are parity bits, further wherein remaining Z bits of the codeword are auxiliary bits, wherein Z is a lifting factor of the low-density parity-check matrix, and wherein Y is a positive integer.

Clause 15. The wireless communication device of clause 14, wherein the encoder is included within a transmitter configured to puncture the auxiliary bits of the codeword and to transmit the first $K_b$*Z bits of the codeword that are the information bits and the subsequent $(Y-1)$*Z bits of the codeword that are the parity bits.

Clause 16. The wireless communication device of any of clauses 14-15, wherein a first column of the base graph is an unpunctured information-bit column and a subsequent $(K_b-1)$ columns of the base graph are information-bit columns, and a further subsequent $(Y)$ columns of the base graph are parity-bit columns, and wherein:
an auxiliary-bit column is located either between the information-bit columns and the parity-bit columns or a rightmost column.

Clause 17. A computerized method, comprising:
selecting a matrix $Q_{Z \times Z}$ that is equal to a sum of a set of $Z \times Z$ lifting matrices in a punctured column of a low-density parity-check matrix, further wherein the matrix $Q_{Z \times Z}$ is invertible;
lifting a base graph according to a value of Z and the matrix $Q_{Z \times Z}$ to create the low-density parity-check matrix;
encoding a plurality of $K_b$*Z information bits into a codeword of $(K_b+Y)$*Z bits according to the low-density parity-check matrix, wherein $K_b$ is a quantity of information-bit columns in the base graph, wherein a set of Z bits of the codeword are auxiliary bits and a set of $(K_b+Y-1)$*Z bits of the codeword include the $K_b$*Z information bits and (Y−1)*Z parity bits, wherein Y is a positive integer; and transmitting one or more symbols conveying information based upon the codeword.

Clause 18. The computerized method of clause 17, wherein the auxiliary bits are located in the codeword either between the information bits and the parity bits or in a rightmost column.

Clause 19. The computerized method of any of clauses 17-18, wherein a first Z*$K_b$ columns of the low-density parity-check matrix are information-bit columns and a subsequent Z*($K_b$+Y) columns of the low-density parity-check matrix are parity-bit columns.

Clause 20. The computerized method of any of clauses 17-18, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a punctured column of the base graph, wherein $Z(a,c)=a*2^c$, where a is an integer from a set of integers having no common divisor larger than 1 and c is an integer.

Clause 21. The computerized method of clause 20, wherein L=Z/a.

Clause 22. The computerized method of clause 21, wherein selecting the matrix $Q_{Z \times Z}$ includes selecting the $k_1, \ldots, k_d$ to have a common divisor L.

Clause 23. The computerized method of clause 17, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a punctured column of the base graph, further wherein selecting the matrix $Q_{Z \times Z}$ includes satisfying at least one of the following conditions:

$$Q^{-1}(x) = Q(x)*x^k;$$

$$Q^{-1}(x) = Q(x)*Q(x^2)*x^k;$$

$$Q^{-1}(x) = Q(x)*Q(x^2)*Q(x^4)*x^k; \text{ or}$$

$$Q^{-1}(x) = Q(x)*Q(x^2)*Q(x^4)*Q(x^8)*x^k.$$

Clause 24. The computerized method of clause 17, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein selecting the matrix $Q_{Z \times Z}$ includes performing factorization to reduce a number of terms of $Q^{-1}(x)$.

Clause 25. A computerized method, comprising:

selecting a matrix $Q_{Z \times Z}$ that is equal to a sum of a set of Z×Z lifting matrices in a first column of a low-density parity-check matrix, further wherein the matrix $Q_{Z \times Z}$ is invertible;

lifting a base graph according to a value of Z and the matrix $Q_{Z \times Z}$ to create the low-density parity-check matrix;

encoding a plurality of $K_b$*Z information bits into a codeword of ($K_b$+Y)*Z bits according to a low-density parity-check matrix, wherein $K_b$ is a quantity of information-bit columns in the base graph, wherein a first $K_b$*Z bits of the codeword are information bits and a subsequent (Y−1)*Z bits of the codeword are parity bits, further wherein Z bits between the information bits and the parity bits are auxiliary bits, and wherein Y is a positive integer; and transmitting one or more symbols conveying information based upon the codeword.

Clause 26. The computerized method of clause 25, transmitting the one or more symbols includes puncturing the auxiliary bits of the codeword and conveying information consistent with the first $K_b$*Z bits of the codeword that are the information bits and the subsequent (Y−1)*Z bits of the codeword that are the parity bits.

Clause 27. The computerized method of any of clauses 25-26, wherein a first Z columns of the low-density parity-check matrix are unpunctured information columns and a subsequent Z*($K_b$−1) columns of the low-density parity-check matrix are information-bit columns, and a further subsequent Z*(Y) columns of the low-density parity-check matrix are parity-bit columns, wherein Z auxiliary-bit columns are located between the information-bit columns and the parity-bit columns.

Clause 28. The computerized method of any of clauses 25-27, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, wherein $Z(a,c)=a*2^c$, where a is an integer from a set of integers having no common divisor larger than 1 and c is an integer; wherein L=Z/a, and wherein selecting the matrix $Q_{Z \times Z}$ includes selecting the $k_1, \ldots, k_d$ to have a common divisor L.

Clause 29. The computerized method of clause 25, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein selecting the matrix $Q_{Z \times Z}$ includes satisfying at least one of the following conditions:

$$Q^{-1}(x) = Q(x)*x^k;$$

$$Q^{-1}(x) = Q(x)*Q(x^2)*x^k;$$

$$Q^{-1}(x) = Q(x)*Q(x^2)*Q(x^4)*x^k; \text{ or}$$

$$Q^{-1}(x) = Q(x)*Q(x^2)*Q(x^4)*Q(x^8)*x^k.$$

Clause 30. The computerized method of clause 25, wherein the matrix $Q_{Z \times Z}$ is equivalent to a polynomial $Q(x)=x^{k_1}+x^{k_2}+ \ldots +x^{k_d}$, wherein $k_1, \ldots, k_d$ represent cyclic shift values, wherein d is a degree of a first column of the base graph, further wherein selecting the matrix $Q_{Z \times Z}$ includes performing factorization to reduce a number of terms of $Q^{-1}(x)$.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A wireless communication device, comprising:

a transmitter comprising a low-density parity check (LDPC) encoder implemented in hardware or a combination of hardware and software, wherein the transmitter is configured to:

encode, using the LDPC encoder, a plurality of Kb*Z information bits into a codeword of (Kb+Y)*Z bits according to a low-density parity-check matrix, wherein Kb is a quantity of information-bit columns in a base graph associated with the low-density parity-check matrix, wherein a first Z bits of the codeword are auxiliary bits and a subsequent (Kb+Y−1)*Z bits of the codeword include the Kb*Z information bits and (Y−1)*Z additional parity bits, wherein Z is a lifting factor of the low-density parity-check matrix, and wherein Y is a positive integer; and transmit one or more symbols conveying information based upon the codeword.

2. The wireless communication device of claim 1, wherein the encoder is included within a transmitter configured to puncture the first Z bits of the codeword and to transmit the subsequent (Kb+Y−1)*Z bits of the codeword.

3. The wireless communication device of claim 1, wherein the low-density parity-check matrix is a lifted version according to Z of the base graph, and wherein a first Z*Kb columns of the low-density parity-check matrix are information-bit columns and a subsequent Z*(Y) columns of the low-density parity-check matrix are parity-bit columns.

4. The wireless communication device of claim 1, wherein the low-density parity-check matrix is a lifted version according to Z of the base graph, wherein a matrix Q_(Z×Z) is equal to a sum of a set of Z×Z lifting matrices in a first Z columns of the low-density parity-check matrix, further wherein the matrix Q_(Z×Z) is invertible.

5. The wireless communication device of claim 4, wherein the matrix Q_(Z×Z) is equivalent to a polynomial $Q(x)=x^{(k\_1)}+x^{(k\_2)}+\ldots+x^{(k\_d)}$, wherein $k\_1,\ldots,k\_d$ represent cyclic shift values, wherein d is a degree of a first column of the base graph, wherein Z(a,c)=a*2c, where a is an integer from a set of integers having no common divisor larger than 1 and c is an integer.

6. The wireless communication device of claim 5, wherein L=Z/a.

7. The wireless communication device of claim 6, wherein the encoder is configured to select the $k\_1,\ldots,k\_d$ to have a common divisor L.

8. The wireless communication device of claim 4, wherein the matrix Q_(Z×Z) is equivalent to a polynomial $Q(x)=x^{(k\_1)}+x^{(k\_2)}+\ldots+x^{(k\_d)}$, wherein $k\_1,\ldots,k\_d$ represent cyclic shift values, wherein d is a degree of a first column of the base graph, further wherein the encoder is configured to select Q_(Z×Z) so that a condition $Q^{(-1)}(x)=Q(x)\ x\_k$ is satisfied, where k is an integer.

9. The wireless communication device of claim 4, wherein the matrix Q_(Z×Z) is equivalent to a polynomial $Q\_(x)=x^{(k\_1)}+x^{(k\_2)}+\ldots+x^{(k\_d)}$, wherein $k\_1,\ldots,k\_d$ represent cyclic shift values, wherein d is a degree of a first column of the base graph, further wherein the encoder is configured to select the matrix Q_(Z×Z) so that a condition $Q^{(-1)}(x)=Q^{(x^4)}Q(x^2)Q(x)x^{(Z-8k\_1)}$ is satisfied.

10. The wireless communication device of claim 4, wherein the matrix Q_(Z×Z) is equivalent to a polynomial $Q(x)=x^{(k\_1)}+x^{(k\_2)}+\ldots+x^{(k\_d)}$, wherein $k\_1,\ldots,k\_d$ represent cyclic shift values, wherein d is a degree of a first column of the base graph, further wherein the encoder is configured to select the matrix Q_(Z×Z) to satisfy at least one of the following conditions:

$$Q-1(x)=Q(x)*xk;$$

$$Q-1(x)=Q(x)*Q(x2)*xk;$$

$$Q-1(x)=Q(x)*Q(x2)*Q(x4)*xk;\ or$$

$$Q-1(x)=Q(x)*Q(x2)*Q(x4)*Q(x8)*xk.$$

11. The wireless communication device of claim 4, wherein the matrix Q_(Z×Z) is equivalent to a polynomial $Q(x)=x^{(k\_1)}+x^{(k\_2)}+\ldots+x^{(k\_d)}$, wherein $k\_1,\ldots,k\_d$ represent cyclic shift values, wherein d is a degree of a first column of the base graph, further wherein the encoder is configured to select the matrix Q_(Z×Z) so that Q−1(x) is factorized to reduce a number of terms in Q−1(x).

12. The wireless communication device of claim 1, wherein the wireless communication device comprises a user equipment.

13. The wireless communication device of claim 1, wherein the wireless communication device comprises a base station.

14. A wireless communication device, comprising:

a transmitter comprising a low-density parity check (LDPC) encoder implemented in hardware or a combination of hardware and software, wherein the transmitter is configured to:

encode, using the LDPC encoder, a plurality of Kb*Z information bits into a codeword of (Kb+Y)*Z bits according to a low-density parity-check matrix, wherein Kb is a quantity of information-bit columns in a base graph associated with the low-density parity-check matrix, wherein a first Kb*Z bits of the codeword are information bits and a subsequent (Y−1)*Z bits of the codeword are parity bits, further wherein remaining Z bits of the codeword are auxiliary bits, wherein Z is a lifting factor of the low-density parity-check matrix, and wherein Y is a positive integer; and transmit one or more symbols conveying information based upon the codeword.

15. The wireless communication device of claim 14, wherein the encoder is included within a transmitter configured to puncture the auxiliary bits of the codeword and to transmit the first Kb*Z bits of the codeword that are the information bits and the subsequent (Y−1)*Z bits of the codeword that are the parity bits.

16. The wireless communication device of claim 14, wherein a first column of the base graph is an unpunctured information-bit column and a subsequent (Kb−1) columns of the base graph are information-bit columns, and a further subsequent (Y) columns of the base graph are parity-bit columns, and wherein:

an auxiliary-bit column is located either between the information-bit columns and the parity-bit columns or as a rightmost column.

17. A computerized method performed by a transmitter comprising a low-density parity check (LDPC) encoder implemented in hardware or a combination of hardware and software, the method comprising:

selecting, by the LDPC encoder, a matrix Q_(Z×Z) that is equal to a sum of a set of Z×Z lifting matrices in a punctured column of a low-density parity-check matrix, further wherein the matrix Q_(Z×Z) is invertible;

lifting, by the LDPC encoder, a base graph according to a value of Z and the matrix Q_(Z×Z) to create the low-density parity-check matrix;

encoding, by the LDPC encoder, a plurality of Kb*Z information bits into a codeword of (Kb+Y)*Z bits according to the low-density parity-check matrix, wherein Kb is a quantity of information-bit columns in the base graph, wherein a set of Z bits of the codeword are auxiliary bits and a set of (Kb+Y−1)*Z bits of the codeword include the Kb*Z information bits and (Y−1)*Z parity bits, wherein Y is a positive integer; and transmitting one or more symbols conveying information based upon the codeword.

18. The computerized method of claim 17, wherein the auxiliary bits are located in the codeword either between the information bits and the parity bits or in a rightmost column.

19. The computerized method of claim 17, wherein a first Z*Kb columns of the low-density parity-check matrix are information-bit columns and a subsequent Z*(Kb+Y) columns of the low-density parity-check matrix are parity-bit columns.

20. The computerized method of claim 17, wherein the matrix Q(Z×Z) is equivalent to a polynomial $Q(x)=x^{(k\_1)}+x^{(k\_2)}+ \ldots +x^{(k\_d)}$, wherein $k\_1, \ldots, k\_d$ represent cyclic shift values, wherein d is a degree of a punctured column of the base graph, wherein $Z(a,c)=a*2c$, where a is an integer from a set of integers having no common divisor larger than 1 and c is an integer.

21. The computerized method of claim 20, wherein L=Z/a.

22. The computerized method of claim 21, wherein selecting the matrix Q_(Z×Z) includes selecting the $k\_1, \ldots, k\_d$ to have a common divisor L.

23. The computerized method of claim 17, wherein the matrix Q_(Z×Z) is equivalent to a polynomial $Q(x)-x^{(k\_1)}+x^{(k\_2)}+ \ldots +x^{(k\_d)}$, wherein $k\_1, \ldots, k\_d$ represent cyclic shift values, wherein d is a degree of a punctured column of the base graph, further wherein selecting the matrix Q_(Z×Z) includes satisfying at least one of the following conditions:

$$Q-1(x)=Q(x)*xk;$$

$$Q-1(x)=Q(x)*Q(x2)*xk;$$

$$Q-1(x)=Q(x)*Q(x2)*Q(x4)*xk; \text{ or}$$

$$Q-1(x)=Q(x)*Q(x2)*Q(x4)*Q(x8)*xk.$$

24. The computerized method of claim 17, wherein the matrix Q_(Z×Z) is equivalent to a polynomial $Q(x)=x^{(k\_1)}+x^{(k\_2)}+ \ldots +x^{(k\_d)}$, wherein $k\_1, \ldots, k\_d$ represent cyclic shift values, wherein d is a degree of a first column of the base graph, further wherein selecting the matrix Q_(Z×Z) includes performing factorization to reduce a number of terms of Q−1(x).

25. A computerized method performed by a transmitter comprising a low-density parity check (LDPC) encoder implemented in hardware or a combination of hardware and software, the method comprising:

selecting, by the LDPC encoder, a matrix Q_(Z×Z) that is equal to a sum of a set of Z×Z lifting matrices in a first column of a low-density parity-check matrix, further wherein the matrix Q_(Z×Z) is invertible;

lifting, by the LDPC encoder, a base graph according to a value of Z and the matrix Q(Z×Z) to create the low-density parity-check matrix;

encoding, by the LDPC encoder, a plurality of Kb*Z information bits into a codeword of (Kb+Y)*Z bits according to a low-density parity-check matrix, wherein Kb is a quantity of information-bit columns in the base graph, wherein a first Kb*Z bits of the codeword are information bits and a subsequent (Y−1)*Z bits of the codeword are parity bits, further wherein Z bits between the information bits and the parity bits are auxiliary bits, and wherein Y is a positive integer; and transmitting one or more symbols conveying information based upon the codeword.

26. The computerized method of claim 25, transmitting the one or more symbols includes puncturing the auxiliary bits of the codeword and conveying information consistent with the first Kb*Z bits of the codeword that are the information bits and the subsequent (Y−1)*Z bits of the codeword that are the parity bits.

27. The computerized method of claim 25, wherein a first Z columns of the low-density parity-check matrix are unpunctured information columns and a subsequent Z*(Kb−1) columns of the low-density parity-check matrix are information-bit columns, and a further subsequent Z*(Y) columns of the low-density parity-check matrix are parity-bit columns, wherein Z auxiliary-bit columns are located between the information-bit columns and the parity-bit columns.

28. The computerized method of claim 25, wherein the matrix Q(Z×Z) is equivalent to a polynomial $Q(x)=x^{(k\_1)}+x^{(k\_2)}+ \ldots +x^{(k\_d)}$, wherein $k\_1, \ldots, k\_d$ represent cyclic shift values, wherein d is a degree of a first column of the base graph, wherein $Z(a,c)=a*2c$, where a is an integer from a set of integers having no common divisor larger than 1 and c is an integer; wherein L=Z/a, and wherein selecting the matrix Q(Z×Z) includes selecting the $k\_1, \ldots, k\_d$ to have a common divisor L.

29. The computerized method of claim 25, wherein the matrix Q(Z×Z) is equivalent to a polynomial $Q(x)=x^{(k\_1)}+x^{(k\_2)}+ \ldots +x^{(k\_d)}$, wherein $k\_1, \ldots, k\_d$ represent cyclic shift values, wherein d is a degree of a first column of the base graph, further wherein selecting the matrix Q_(Z×Z) includes satisfying at least one of the following conditions:

$$Q-1(x)=Q(x)*xk;$$

$$Q-1(x)=Q(x)*Q(x2)*xk;$$

$$Q-1(x)=Q(x)*Q(x2)*Q(x4)*xk; \text{ or}$$

$$Q-1(x)=Q(x)*Q(x2)*Q(x4)*Q(x8)*xk.$$

30. The computerized method of claim 25, wherein the matrix Q(Z×Z) is equivalent to a polynomial $Q(x)=x^{(k\_1)}+x^{(k\_2)}+ \ldots +x^{(k\_d)}$, wherein $k\_1, \ldots, k\_d$ represent cyclic shift values, wherein d is a degree of a first column of the base graph, further wherein selecting the matrix Q_(Z×Z) includes performing factorization to reduce a number of terms of Q−1(x).

* * * * *